United States Patent
Anderson

(10) Patent No.: US 10,460,249 B2
(45) Date of Patent: Oct. 29, 2019

(54) SYSTEM AND METHOD FOR PROJECTING A LIKELY PATH OF THE SUBJECT OF A SEQUENTIAL DECISION PROBLEM

(71) Applicant: Supported Intelligence, LLC, East Lansing, MI (US)

(72) Inventor: Patrick Lee Anderson, East Lansing, MI (US)

(73) Assignee: SUPPORTED INTELLIGENCE, LLC, East Lansing, MI (US)

( * ) Notice: Subject to any disclaimer, the term of this patent is extended or adjusted under 35 U.S.C. 154(b) by 1064 days.

(21) Appl. No.: 14/871,029

(22) Filed: Sep. 30, 2015

(65) Prior Publication Data

US 2017/0091635 A1   Mar. 30, 2017

(51) Int. Cl.
*G06N 5/04* (2006.01)
(52) U.S. Cl.
CPC .................... *G06N 5/045* (2013.01)
(58) Field of Classification Search
CPC ..................... G06N 5/045; G06Q 10/0637
See application file for complete search history.

(56) References Cited

U.S. PATENT DOCUMENTS

| | | | | |
|---|---|---|---|---|
| 2005/0041744 A1* | 2/2005 | Verhaegh | ............... | G06F 9/4887 375/240.26 |
| 2010/0082513 A1* | 4/2010 | Liu | ...................... | H04L 63/1458 706/46 |
| 2011/0302002 A1* | 12/2011 | Dance | ................ | G06Q 30/0201 705/7.35 |
| 2012/0030137 A1* | 2/2012 | Garcke | .................. | G06Q 40/04 705/36 R |
| 2013/0080377 A1* | 3/2013 | Newnham | ............ | G06N 99/005 706/52 |

* cited by examiner

*Primary Examiner* — Robert A Cassity
*Assistant Examiner* — Robert Bejcek, II

(57) ABSTRACT

A system and method for projecting the likely future path of the subject of a sequential decision problem. The subject of the sequential decision problem takes an action beginning with the starting state of affairs and probabilistically transitions into other states according to the structure of the decision problem, the solution to the decision problem, possibly random events, and the decisions of the subject. The likely future path consists of a sequence of actions taken by the subject, the states the subject will likely be in after taking the projected actions, and the rewards the subject is likely to receive along the future path.

20 Claims, 15 Drawing Sheets

SYSTEM AND METHOD FOR PROJECTING A LIKELY PATH OF THE SUBJECT OF A SEQUENTIAL DECISION PROBLEM

BACKGROUND OF THE INVENTION

Field of the Invention

Current systems and methods of composing and solving sequential decision problems suffer from multiple failures, including the inability to take into account common aspects of these problems, such as the existence of real options and asymmetric risks; the inability to provide reliable or readily understandable decision advice; and the inability to accurately visualize a likely future path forward of the subject of the decision problem. Furthermore current systems and methods rely on the user's own ability to interpret and forecast the optimal actions and likely outcome of those actions in the future.

A sequential decision problem is one in which the subject of the problem can find itself in one of a set of states of affairs (known as "states"), and take one of a set of actions in these states, and where the subject transitions forward in time given the structure of the problem, possibly random events, and the actions taken by the subject of the problem. Many such sequential decision problems can be formulated as functional equations. If such functional equations are properly formulated and have solutions (neither of which is a trivial concern), there are at least two iterative algorithms that can solve such equations, known as Policy Improvement and Value Function Iteration. The solution to such an equation is a mapping from each state to a value and a value-maximizing action. However, neither of the mentioned solution algorithms forecasts a likely future forward path of the subject of the problem; the iterations involved in the solution algorithms themselves do not identify such a likely path; and the solution to the functional equation does not include a likely future path.

Description of Related Art

In an effort to gain the benefits of projecting a likely path, a number of unsatisfactory methods are commonly used to naively approximate possible future paths of the subject of a decision problem. These include: projecting a simple "average" path (for example, estimating an average future growth rate and simply applying that to the state variable year after year); high-low simulations that rely on specified deviations above and below the simple average path; Monte Carlo simulations (involving random jumps above or below the simple average path); and the use of a simple event tree (or "decision tree") where the "expected value" (a variation of the "average" method mentioned above) is used to determine the path forward when two or more options are present. Each of these methods fails to properly consider the information available to the subject at the time of the decision; the impact that the subject can have by choosing among the available actions at that point in time; the compound effect of multiple decisions over time; the number of possible combinations of such decisions and states of affairs; asymmetric risks; real options; or multiple such deficiencies.

Even when the sequential decision problem has a fixed time horizon and limited choices, the future path may still not be known. When uncertainty exists about the transition from the current state, the next state is not known with certainty even if one assumes a specific action. Therefore the forward path is not known with certainty even though the solution to a functional equation includes a mapping from each state to a value and a value-maximizing action Additionally, in many cases a combination of transition probabilities and possible rewards may result in two possible paths having equal expected value of future rewards for a certain set of time periods. In such cases, any solution algorithm must arbitrarily select one over the other. The use of such an arbitrary rule would disqualify this selection as an indication of a true likely path, unless the arbitrary rule was known or assumed to represent the likely decisions of the subject of the decision problem.

As noted, the use of "expected value" within a solution algorithm could force an arbitrary and inaccurate representation of the behavior of the user. To illustrate the problems with the use of the mathematical concept of expected value as a decision criterion, consider the expected value of a 1% chance of winning one million dollars. This expected value is the same as a 100% chance of winning $10,000. However, few people would be indifferent to this choice. A solution algorithm that relied upon this method of selecting segments of possible future paths implicitly imposes upon the subject of the problem a manner of behavior that is not consistent with the actual preferences and behavior of most humans, even though it represents in some sense consideration of the "average" outcome and involves one plausible interpretation of human reaction to uncertainty.

SUMMARY OF THE INVENTION

The present invention relates to a system and method for projecting a likely future path of the subject of a sequential decision problem.

In a disclosed embodiment a computer-aided likely path projecting system is provided. The system has an input device, an output device and a processor programmed with instructions to project a likely path for the subject of a sequential decision problem. The processor facilitates input of information from the user through the user input device. The information includes a sequential decision problem to be solved consisting of the following six elements: a set of actions available to the subject, at least one state dimension, corresponding rewards for each combination of state and action, corresponding transition probabilities among states, a discount factor, and a time index consisting of sequential points requiring actions or decisions by the subject of the problem. The processor forms a functional equation, including error checking and validating the inputs and performing a convergence check to ensure that the functional equation will be solvable. The processor solves the functional equation and generates an optimal policy, finding, for every point in the decision index, the overall value-maximizing action. The set of decisions made at each point in the decision index forms the optimal policy. The processor generates a likely path by identifying an assumed action for each potential state at the initial point in the decision index, based upon the optimal policy. For the assumed action the processor evaluates likely transitions by comparing the probabilities in the transition matrix for the combination of state dimensions. From the likely transitions the processor generates the likely path for each decision point in the decision index by selecting the most likely transition from the possible transitions at each state. The processor outputs the likely path to user through the output device.

In another disclosed embodiment a likely path projecting method is provided. The method includes the steps of providing the user with a computer system having an input device, an output device, and a processor programmed with instructions with instructions for projecting a likely path for the subject of a sequential decision problem. In another step the processor is programmed to receive inputs from the user, including a sequential decision problem to be solved consisting of the following six elements: a set of actions available to the user, at least one state dimension, corresponding rewards for each combination of state and action, corresponding transition probabilities among states, a discount factor, and a time index consisting of sequential points requiring actions or decisions by the subject of the problem. In another step a processor forms a functional equation, including error checking and validating the inputs and performing a convergence check to ensure that the functional equation will be solvable. In another step the processor solves the functional equation and generates an optimal policy, finding, for every point in the time index, the overall value-maximizing action. The set of decisions made at each point in the time index forms the optimal policy. In another step the processor generates a likely path by identifying an assumed action for each potential state at the initial point in the time index, based upon the optimal policy. In another step the processor evaluates the likely transitions by comparing the probabilities in the transition matrix for the combination of state dimensions. The processor generates the likely path for each decision point in the time index by selecting the likely transition from the possible transitions at each state. In another step the processor outputs the likely path to the user through the output device.

DETAILED DESCRIPTION OF THE INVENTION

Projecting a likely path forward for the subject of a decision problem allows the user of the method to visualize the likely actions the subject should take, and the likely future conditions the subject will face, if the subject follows the decision advice recommended in the solution to the decision problem. By having a such a projected likely future path, the user gains the ability to reflect on the decision making advice, better adapt to changing conditions, and consider possible alternate paths that may better suit the subject's personality or that are sub-optimal is some respects but more preferential to the subject for other reasons. Furthermore this system and method allows the user to project a likely path forward when stochastic (random) elements exist in the transition probabilities inherent in the structure of the problem, and properly take into account real options, asymmetric risk, and management flexibility. Furthermore, this system and method allows the user to project such a likely path while dealing with a very large number of mathematically possible paths, and do so within practical limits of computer memory.

Figure 1:
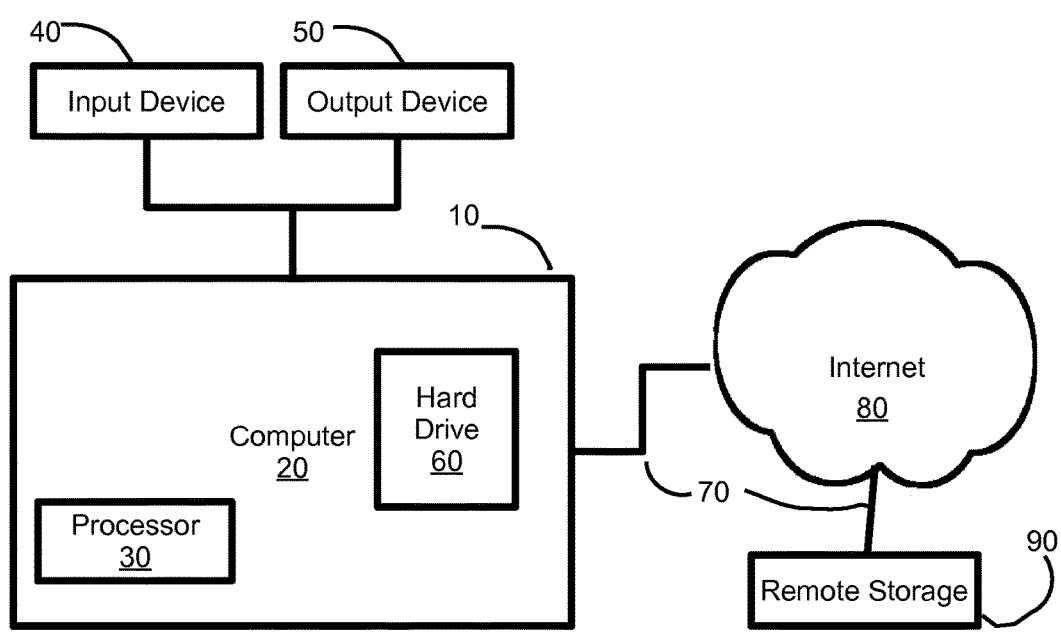
FIG. 1. is a diagram of a computer system for executing a computer program for projecting a likely path.

The disclosed system and method may be implemented by a variety of computing systems 10 (FIG. 1). The computing system 10 has a computer 20. The computer 20 has a processor 30, an input device 40, an output device 50 and a hard drive 60. The computer 20 is capable of executing computer software (not shown) that programs the computer 20 to evaluate decision problems, project a likely path and display that likely path to the user. The computer 20 may be a personal computer, laptop, desktop, smart phone, tablet, personal digital assistant, a networked server or any other similar device.

The computer software may be stored on a hard drive 60, or other local storage devices (not shown) such as a solid state drive, magnetic tape or optical storage. Additionally, parts of the computer system may be located remotely. For example, the computer software for programming the computing system 10 may be remotely stored in remote storage device 90 and accessed over a network 70. The network 70 may be a local network, a wide area network, a virtual private network, the internet or any combination of linked devices. For example, the computing system 10 may be on a local network connected to the internet connected to another local network connected to the remote storage device 90.

The processor 30 is any computer processor capable of executing computer software. The processor 30 does not refer specifically to a central processing unit, but may also refer to combinations of central processing units and graphics processing units or other combinations of electronic devices capable of processing information according to instructions provided by computer software.

The input device 40 inputs information into the computing system 10 from the user (not shown) or from other sources (such as over the network 70). The output device 40 outputs information from the computing system 10 to the user. The input device 40 and the output device 50 may be the same device. For example, a touchscreen monitor may be the input device 40 and the output device 50, as the touchscreen monitor is capable of displaying and receiving information. The input device 40 may be a mouse, a keyboard, voice control or gesture recognition or any other device capable of inputting information to the computer system 10. The output device 50 may be a computer screen, phone screen, monitor, television, printer, or any other device capable of outputting information from the computer system 10.

The disclosed system and method can be stored or provided as computer software to the user on a variety of computer-readable media, such as hard drives, solid state drives, optical discs, or any other computer-readable medium capable of storing instructions for the processor. Additionally, the disclosed system and method may be transmitted electronically to the user over the network 70.

Figure 2:
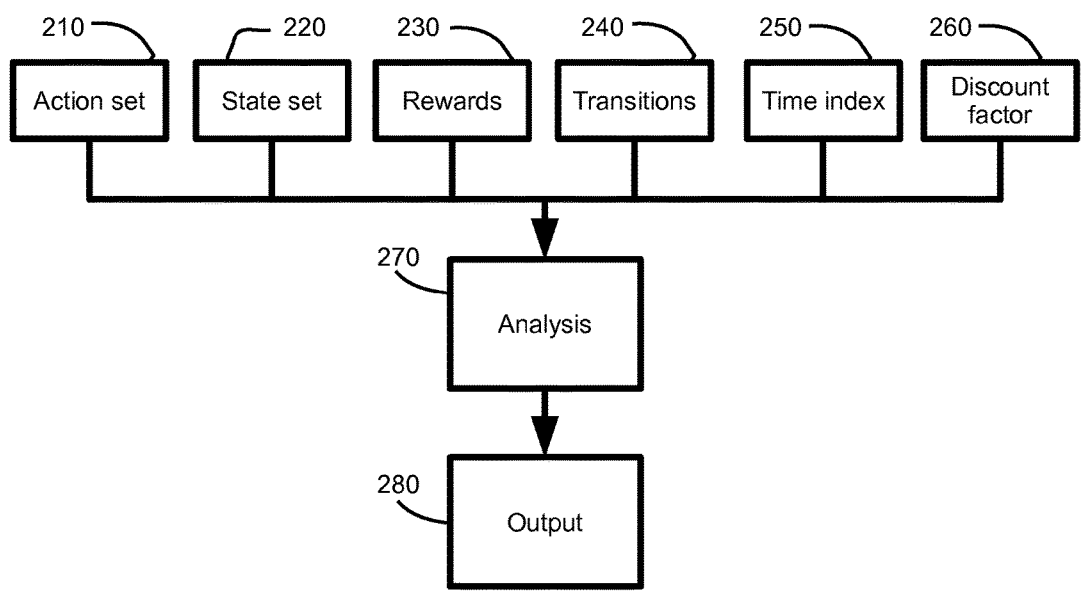
FIG. 2. is a flow chart of the combination of inputs for projecting a likely path.

FIG. 2 is a flow chart showing information input to the analysis engine 210. The user provides an action set 210, a state set 220, rewards 230, transitions 240 a time index 250 and a discount factor 260. The analysis engine 270 can evaluate the inputs, including error checking, validation and convergence checking to ensure the functional equation is solvable; solve the functional equation; generate an optimal policy that maximizes the value to the subject of the problem; and generate a likely future path.

The action set 210 is the set of actions that the user selects from, at each point in the time index 250. For example, a user may be able to raise, lower or maintain the price of a good once a month. Actions in the action set 210 also have action costs. At each point in the time index 250 the user is in a state and selects an action, the user receives a reward determined by the rewards 230 and the action costs from the action set 210. The action cost may be an arithmetic, multiplicative, or other function of variables associated with the state and action vectors and the structure of the problem.

The state set 220 is the set of possible situations in which the subject must make a decision. Each state describes the value of one or more state dimensions, which represent the conditions the subject would like to consider when solving the decision problem to maximize the expected reward. For example, the user of the method may like the subject to consider a state dimension representing the amount of inventory on hand, and another representing the price of their product. The state set would then contain all relevant combinations of inventory and price The reward set 230 is the set of rewards received by the subject when transitioning according to the transitions 240 from one state to another state at a point in the time index 250 after having selected an action from the action set 210. For example, the subject chooses to raise the price of a good, the subject (according the probabilities in the transitions 240) could transition to a point in the state set 220 where the user has lower inventory or higher inventory. When the subject transitions from one state to another state (which may be the same as the first state) the subject receives a reward from the reward set 230.

The transitions 240 represent the probabilities of moving between states in the state set 220 when selecting an action from the action set 210. For example, the subject is considering inventory levels when setting prices. If the subject raises prices inventory could go down, which likely has a low probability of occurring (though it is possible: for example a luxury good or a good otherwise in high demand). Inventory could also go up or stay the same. The transitions 240 in this example would represent the probabilistic outcomes of price changes on inventory levels.

The time index 250 is a set of decision points—discrete moments in time—when the subject takes an action from the action set 210. For example, price could be changed monthly, daily or hourly.

The discount factor 260 takes into account both the risk of operating within the structure of the decision problem, and the time value of money, as well as potentially other subjective considerations related to the timing of rewards and actions. For example the discount factor 260 may represent the subject's preference for immediate over delayed rewards or the subject's assessment of the underlying risk to the subject embedded in the decision problem. The use of such a factor sometimes considered as converting future potential rewards to their "representing the present value," of rewards, The analysis engine 270 represents an electronic system capable of receiving and evaluating the inputs (the action set 210, the state set 220, the rewards 230, the transitions 240, the time index 250 and the discount factor 260), processing the inputs to form a functional equation, error checking, validating and convergence checking the functional equation, solving the functional equation, taking the solution to the functional equation and generating a likely path.

The output 280 block represents an electronic system capable of outputting the results to the user. The results may be in the form of graph of actions to take at various decisions points on the time index 250 for various starting conditions, in a list or other suitable means such as rewards for various paths and starting conditions.

Figure 3:
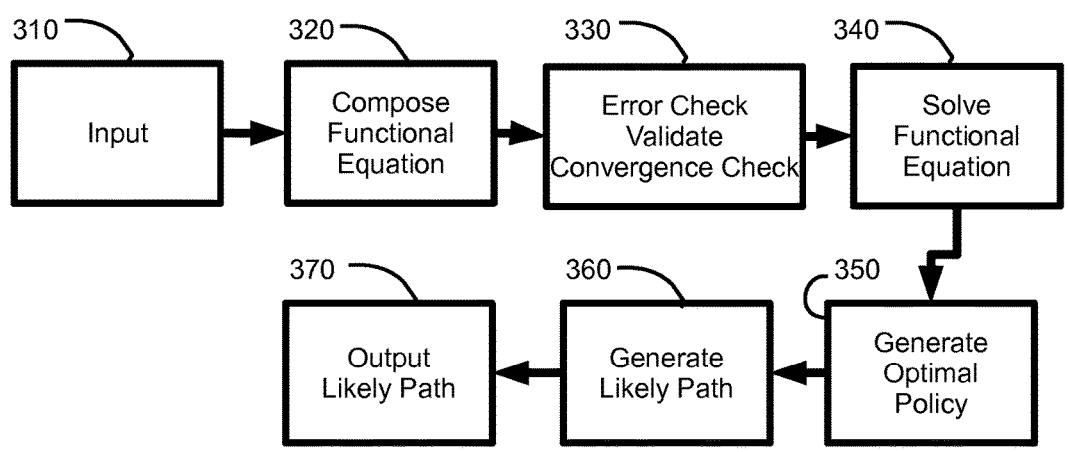
FIG. 3. is a flow chart of a method of projecting a likely path.

FIG. 3. shows a flowchart of a disclosed method. Step 310 accepts input from the user, including the action set 210, the state set 220, the rewards 230, the transitions 240, the time index 250 and the discount factor 260. In step 320 the inputs are formed into a functional equation. In step 330 the inputs are error checked, validated and checked for convergence to insure that the functional equation is solvable. In step 340 the functional equation is solved; this solution included the calculation shown in step 350 where the optimal policy (a mapping from each state to a recommended action) is generated as part of the solution to the functional equation. In step 360 a likely path forward is generated from the optimal policy, the structure of the problem, and any user-specified personality or other parameters used in the projection of the likely future path. In step 370 the likely path is output to the user.

The input step 310 may be performed by many computer input devices, such as scanners, keyboard, computer mice, voice control or touchscreen, etc. The user may be prompted for each individual input (for example, first prompted for state set 220 and then for the action set 210 and so on) or the user may input all of the inputs at once. The input accepting step 310 may prompt the user to input optional information such as an absorbing state or a user defined reward combination function. The input step may allow the user to input personality information, desires about whether to calculate only the most likely path or other paths as well, and how to choose between alternate paths or select transitions when nearly equivalent probabilities exist given a specific state and action. The inputs accepted in step 310 may be stored in any format, such as a matrix or any other format offering computational efficiency, storage efficiency or convenience.

Step 320 composes a functional equation, an equation that may be solved to maximize the value to the subject of a sequential decision problem. The user may be prompted to select a solution technique, or a default solution technique can be defined.

Step 330 error checks, validates and convergence checks the functional equation to ensure that the functional equation describes a decision problem solvable through one of the techniques described below. Step 330 confirms that all necessary portions of the problem have been defined, either by default values or by the user, and that the values provided will not result in the computer entering an infinite loop during the solution process.

Step 340 solves the functional equation created in step 340 and outputs the solution to step 350. Step 340 may use different solution techniques depending on the particular form of the functional equation created in step 320 and checked in step 330. Some solution techniques include value function iteration (also known as successive approximations, over-relaxation, or pre-Jacobi iteration), policy iteration (also known as policy improvement), a root-finding algorithm, or other numeric solution techniques.

In step 350 the optimal policy (the mapping of states to a recommended set of actions) is created from the solution found in step 340. The optimal policy, along with optional inputs from step 310, forms the input to step 360.

Step 360 generates a likely path by walking through, from the initial states, the paths the subject can take using the optimal policy from step 350, and identifying the most likely path and other paths as required by the optional input in step 310.

Step 370 outputs the most likely path or other paths indicated by the optional input to the user. The output may be in the form of a graph of states and actions, a graph of actions and their rewards, a visualization of alternate paths and the differing rewards or a list form of the graphs. The output step may prompt the user to try a different solution method or to consider changing one or more of the inputs, such as suggesting a different path when the rewards from multiple paths are otherwise equal.

Figure 4:
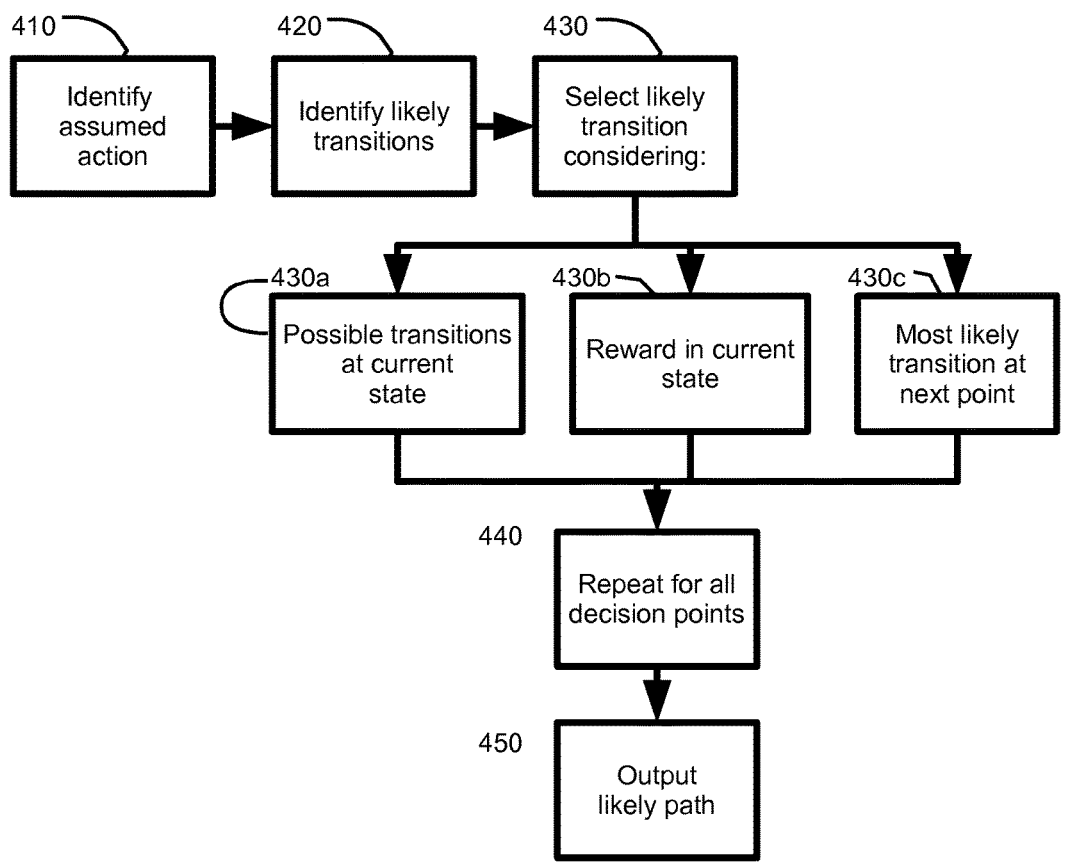
FIG. 4. is a flow chart of an exemplary method for projecting a likely path.

FIG. 4. shows a detailed explanation of what occurs in step 360. In step 410 the assumed action for the initial condition (state) is identified, based on the solution to the sequential decision problem, and any user-input parameters. In step 420 the likely transitions from the initial state are identified, by referencing the solution to the problem, the assumed actions, and any optional user inputs such as alternate transitions, a user preference for long odds or risk-aversion. In step 430 the likely transition is selected considering all possible transitions at current state 430a, the reward at the current state 430b and the most likely transition to be experienced at the next decision point 430c. In step 440, steps 410 through 430 are repeated until either the end of the time index or (for an infinite time horizon problem) another condition such as achievement of a steady state or a predetermined number of decision epochs (number of time intervals) is reached.

Step 410 identifies the assumed action for each state. This is done by referencing the optimal policy from the solved decision problem, and assuming the subject of the problem takes the value-maximizing action for each state. Alternatively, this may be achieved by referencing the solved decision problem, but using any other method for choosing among the actions available to the subject for each state, which method we refer to as the subject's "personality." For example, the subject may follow the optimal policy for all states except one, where they take one specified action regardless of the value-maximizing action; choose to occasionally take the second most valuable action in each state; avoid taking one action even in instances where that action is value-maximizing, and instead choose the second-best; follow a habit formed in the initial time periods even after such a habit (pattern of decisions) is no longer value-maximizing, and do so for a specified number of time intervals; be wary of any action that involves "long odds" of success; be attracted to "long odds" when in certain states.

Step 420 identifies likely transitions by referencing the appropriate portions of the transition matrix, corresponding to the assumed action taken at each decision point. This step does not choose among the likely transitions, it merely identifies transitions that could occur with a non-zero probability.

Step 430 (including 430a, 430b and 430c) includes the process of selecting one transition from the likely transitions identified in Step 420. This selection may be made by choosing the statistically most likely transition, or by any other method for choosing among probabilistic events. For example, the user may wish to model a path where the transition with the lowest non-zero probability occurs at each point in the decision index, or where the transition resulting in the highest expected reward occurs at each point in the decision index.

Step 450 concludes the process by outputting the likely path to the user. The likely path may be reported in any number of ways of displaying such information. For example, the process may output a table describing the state at each decision point, the assumed action, the implied reward, and the state at the next decision point. As another example, Step 450 may output the likely path as a graph of the state occupied by the subject of the sequential decision problem at each point in the decision index.

Figure 5:
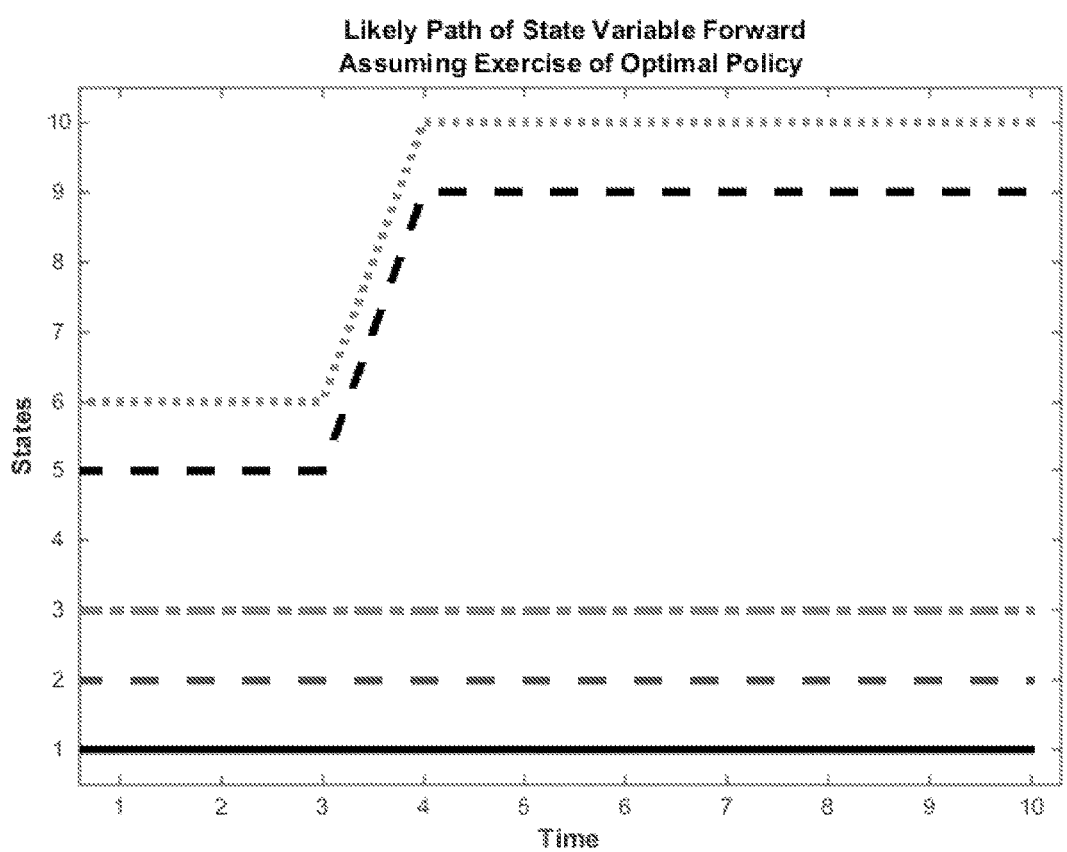
FIG. 5. is a graph showing a likely path of a subject for different starting states.
Figure 6:
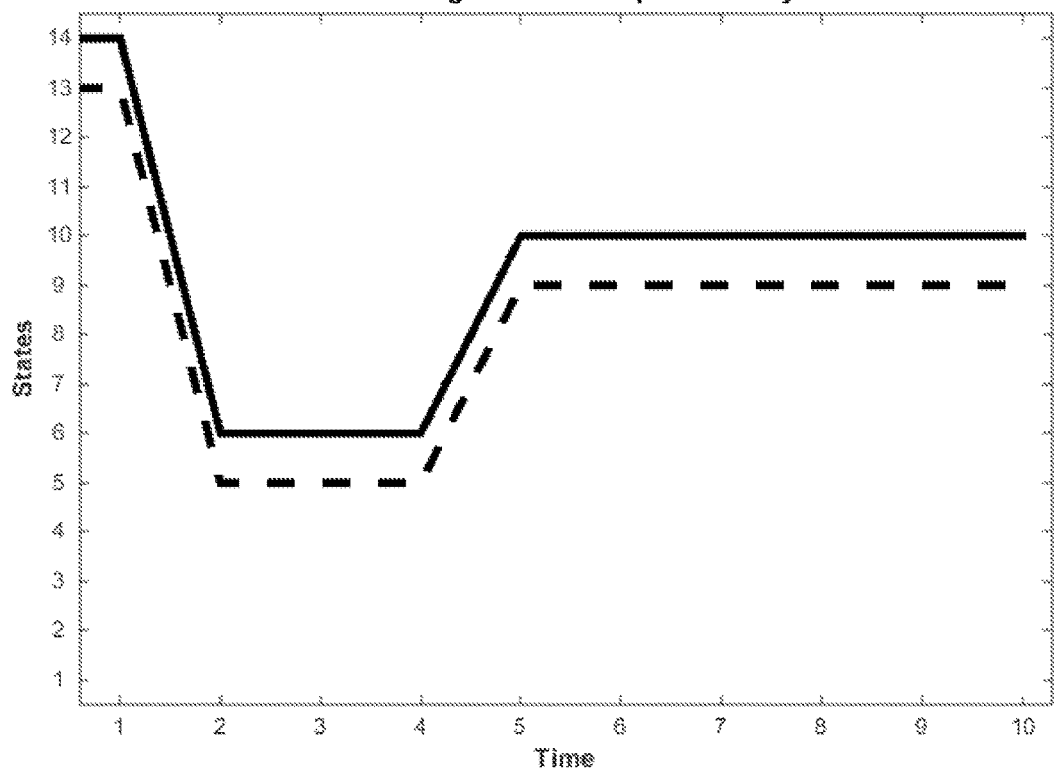
FIG. 6. is a graph showing a likely path of a subject for different starting states.
Figure 7:
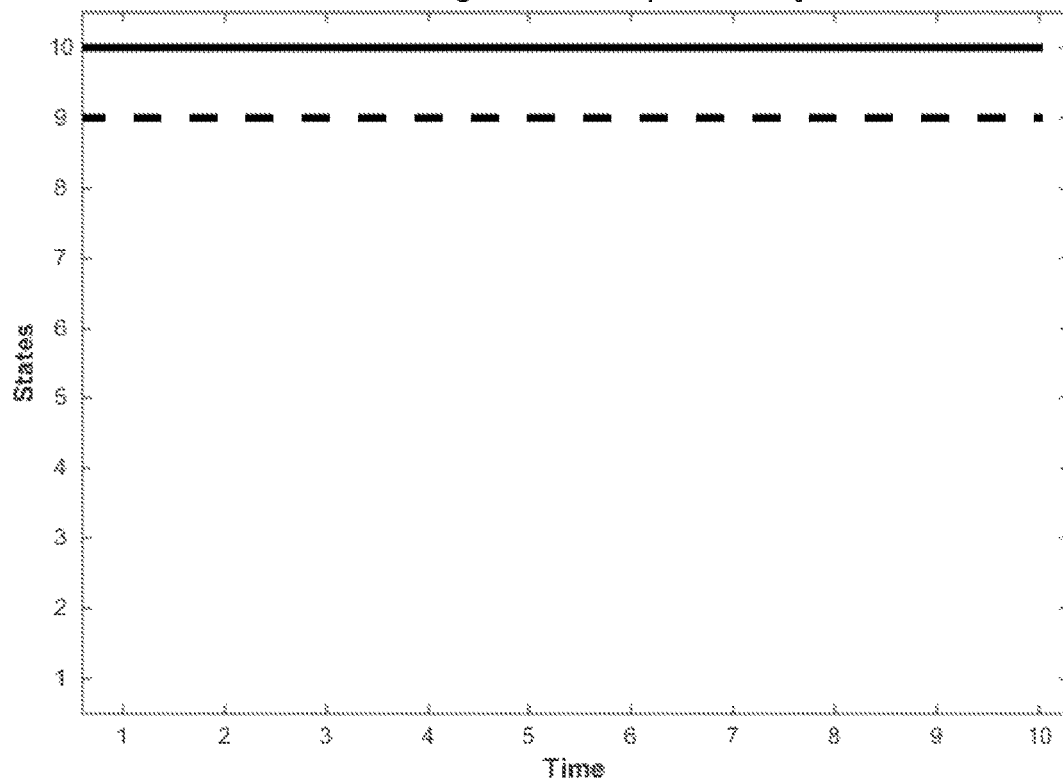
FIG. 7. is a graph showing a likely path of a subject for different starting states.

FIGS. 5, 6 and 7 show various graphs of possible output to the user showing the likely future path forward of the subject assuming at each decision point the subject follows the optimal policy for different initial conditions. Additionally, likely paths may converge or cross (in a state versus time graph), although this is not shown for clarity.

Figure 8:
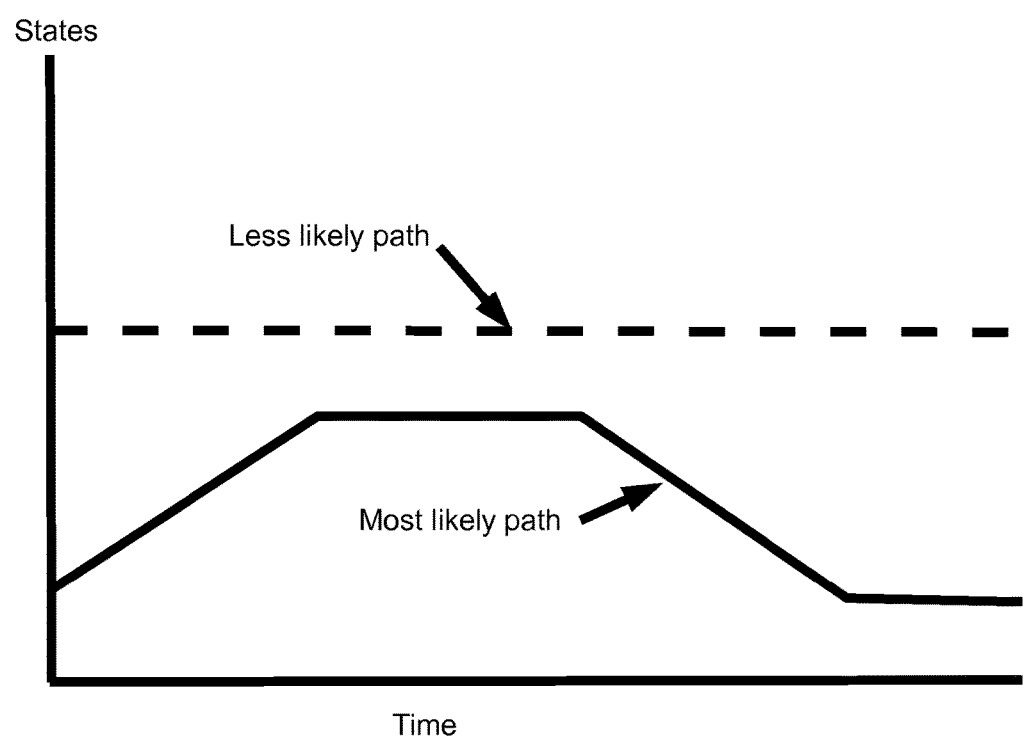
FIG. 8. is a flowchart showing the evaluation of a most likely path and a less likely path.

FIG. 8 shows a graph of a situation where the user is shown the most likely path and a less likely path to allow the user to visualize an alternative that may be desirable for reasons other than pure reward maximization. In this graph the user may consider selecting the less likely path, accepting the smaller reward because the predicted state change may be more comforting to the user. For example, for a sequential decision problem involving choice of job, the most likely path could represent a choice of jobs calling for frequent work-related travel around the country (where the state is location of work and the rewards are pay for that work), and the less likely path represents a choice of jobs that provide a lower reward (less pay) but also less work-related travel. This allows the user to visualize future scenarios that may represent a gain in pay or travel without having to specifically define how much travel is worth in terms of reward.

Figure 9:
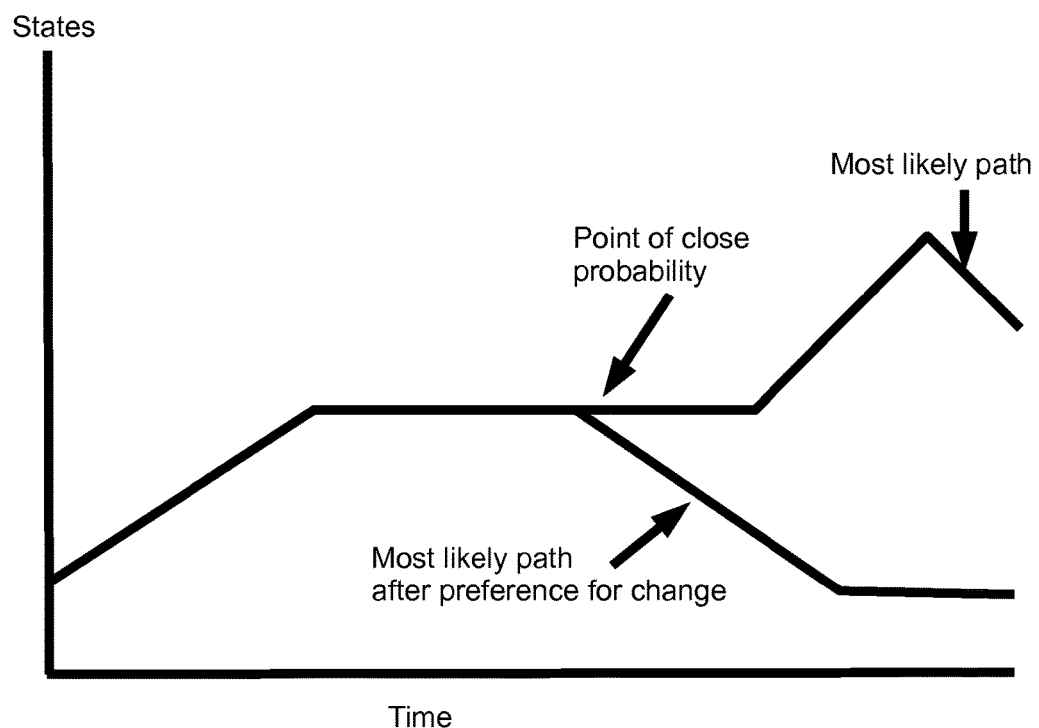
FIG. 9. is a flowchart showing the evaluation of several paths of close probability and selecting among them according to alternate criteria.

FIG. 9. shows a graph of an embodiment where the user has defined a preference for determining state transitions when the transitions underlying potential likely paths are close in probability, where the determination of what constitutes "close" may be by a user-defined variable, a preset condition, or set through analysis of the possible future paths. In FIG. 9 the most likely path changes at the point of close probability, because of the user's preference for changing states when there is a similarly probable path and a point of close probability occurs.

Figure 10:
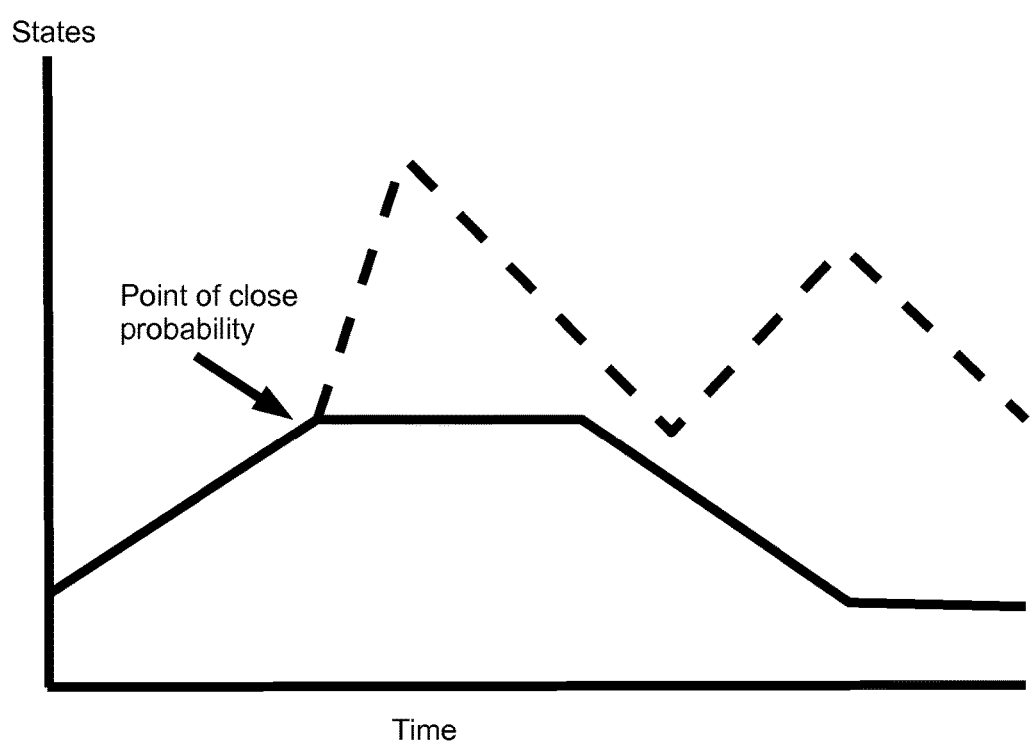
FIG. 10. is a flowchart showing the evaluation of several paths and prompting the user to select between the paths.

FIG. 10. shows a graph of an embodiment where the user is prompted at a point of close probability to select a choice that generates the next step on the path. This can reduce the computational overhead in a situation where the time horizon is infinite, or very large, or there are a large number of state dimensions. Additionally, this notifies the user that there may be other paths to choose without unduly cluttering the final output.

Figure 11:
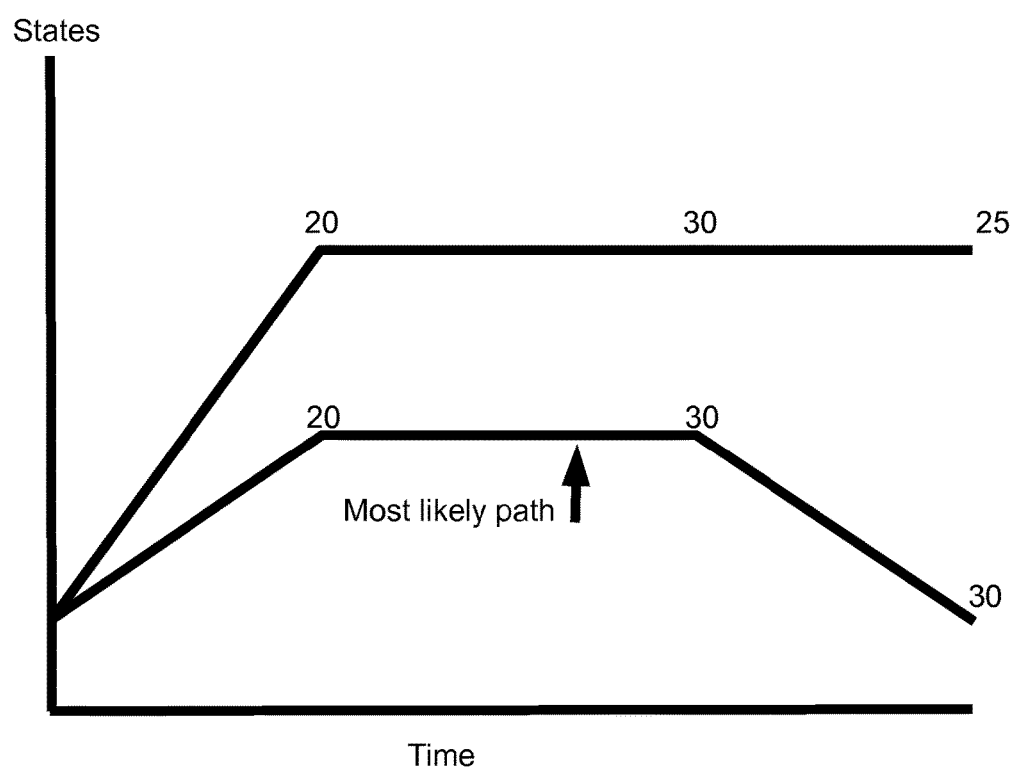
FIG. 11. is a graph showing a likely path of a subject for different starting states and the expected rewards.

FIG. 11. shows a graph of an embodiment where the most likely path and a second, less likely path are shown to the user; in this embodiment with the rewards at each decision point shown above the decision point (time interval) on the graph. This allows the user to visualize other paths that may have differing (or lesser) rewards but be desirable for other reasons.

Figure 12:
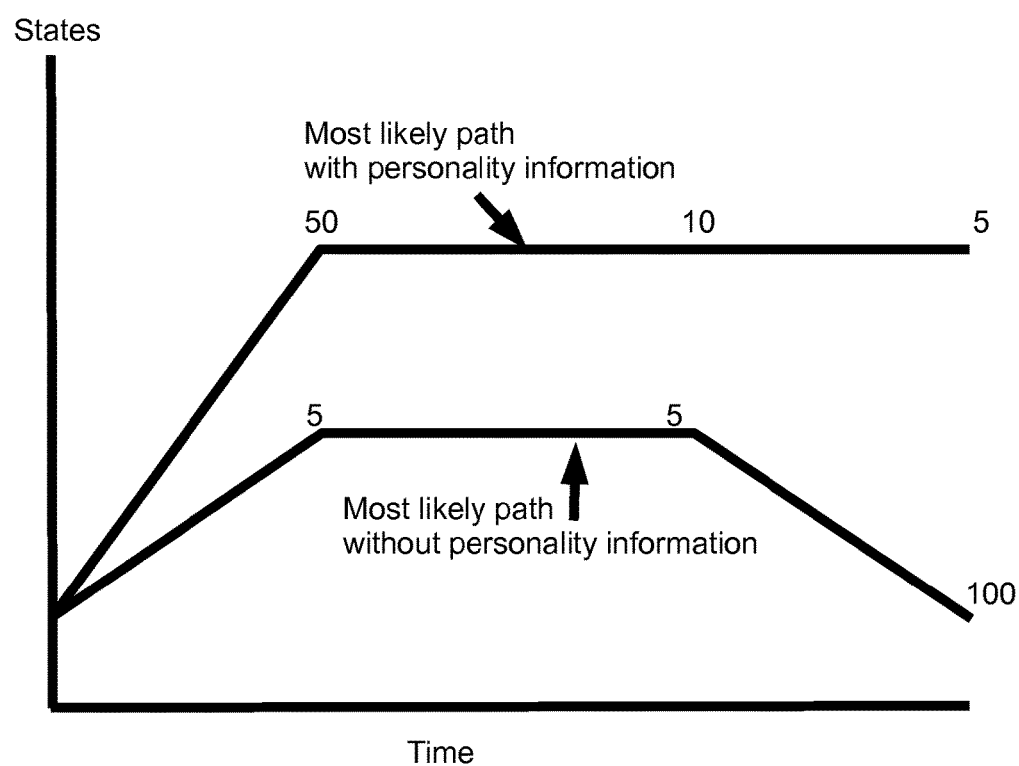
FIG. 12. is a flowchart showing the use of user personality information in projecting the likely path.

FIG. 12. shows a graph of an embodiment where personality parameters are used in the calculation of the likely path. These personality parameters could include statements regarding risk aversion; choices specified by the user for a condition or set of conditions; statements regarding the subject's approach to "long odds" choices; statements regarding the subject's preference for immediate rewards or larger deferred rewards; statements regarding habit formation; or a programmatic statement identifying multiple such personalities and specifying under what conditions the initial personality changes to a second personality. For the latter statement, such a condition could include a number of time periods, the achievement of a specific state, the achievement of a threshold sum or weighted sum of rewards, the execution of an action, or some combination of the above.

The processor then generates a likely path, as described above, using the personality information. In FIG. 12. the user has an expressed personality for immediate rewards rather than later payoffs. Other possible personalities include a "slow unwind" option, in which relatively low-cost actions would be preferred that would cause the end of operations or the ceasing of receiving rewards; or a "go big or go home" option, in which the subject prefers high risk high reward behavior over consistent, low risk low reward behavior.

Figure 13:
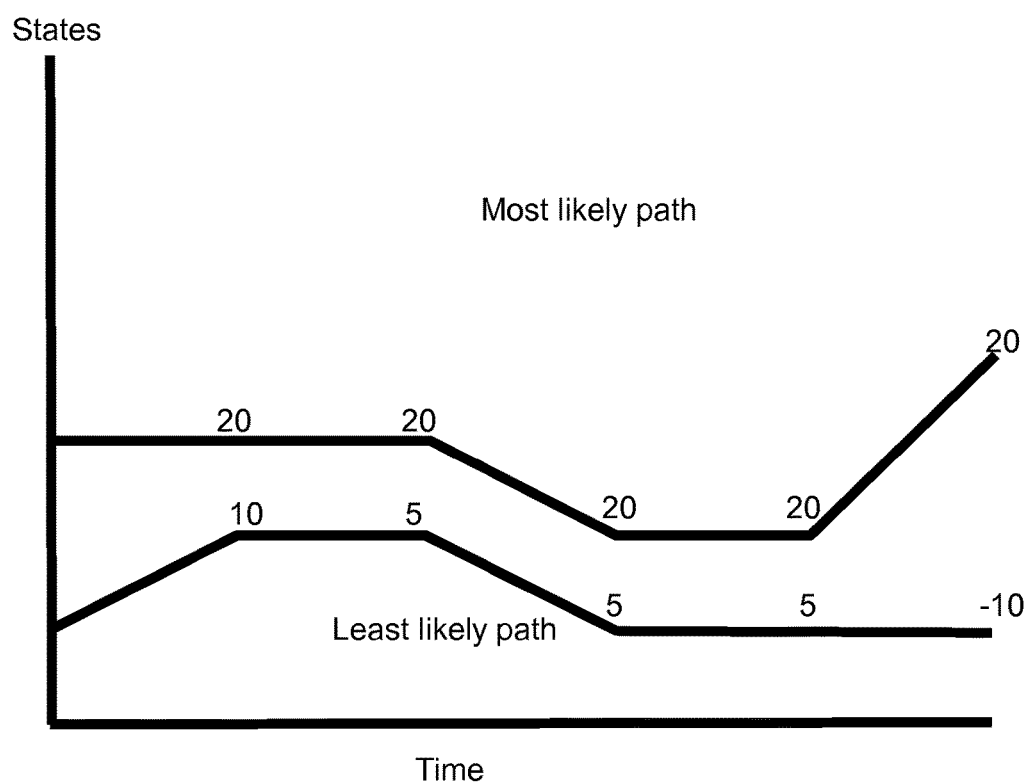
FIG. 13. is a flowchart showing the evaluation of a least likely path.

FIG. 13. shows a graph of an embodiment where the user is shown the most likely and the least likely path assuming a value-maximizing personality. This allows the user to consider a hypothetical worst case scenario, perhaps when evaluating whether to invest in a company in which the subject would not have control over the selected actions.

Figure 14:
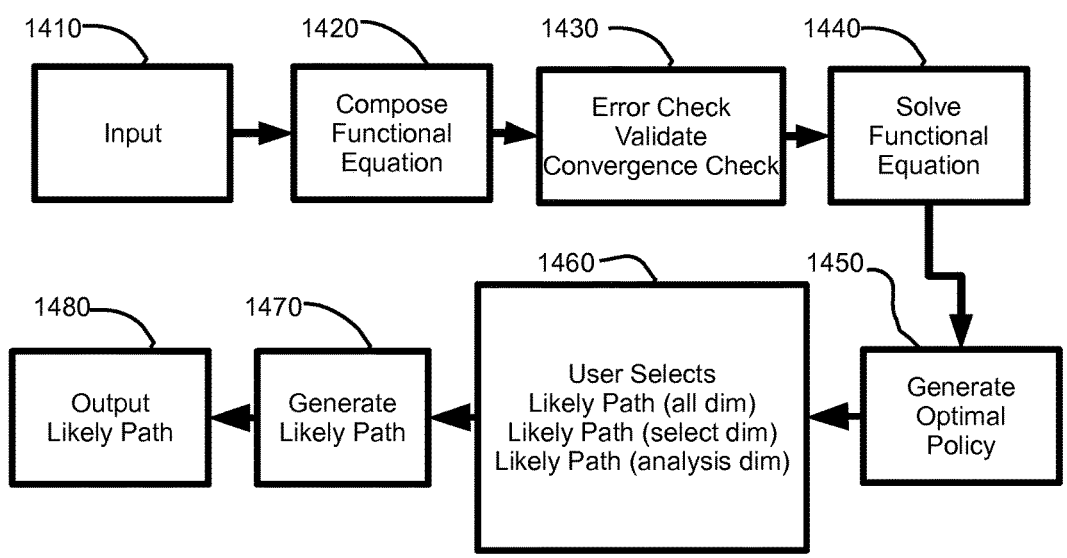
FIG. 14. is a flowchart showing the user selecting the which dimensions to use in evaluating the likely path.

FIG. 14. shows an embodiment where the user may select, in step 1460, whether to calculate a likely path using all state dimensions, a subset of the state dimensions (selected by the user) or use a heuristic calculation such as calculating several likely paths for different combinations of state dimension and displaying the likely path only for a dimension of significance. Certain state dimensions may be considered significant state dimensions, when the state dimension is statistically more important to the outcome or to the subject. For example, a decision problem concerning commercial fishing may have three state dimensions, weather, temperature and lunar phase. However, upon further analysis weather is the determining factor in almost all situations. Temperature and lunar phase only alter a small number of cases. To decrease the computational complexity, increase user friendliness or for other optimization reasons a statistical analysis to determine a subset of significant state dimensions may be performed to reduce the number of state dimensions used in calculating a likely path. For example, the user could have the most likely path displayed as it depends only on the most statistically significant dimension. Step 1410, 1420, 1430, 1440, 1450, 1470 and 1480 are otherwise analogous to the similar steps in FIG. 3.

Figure 15:
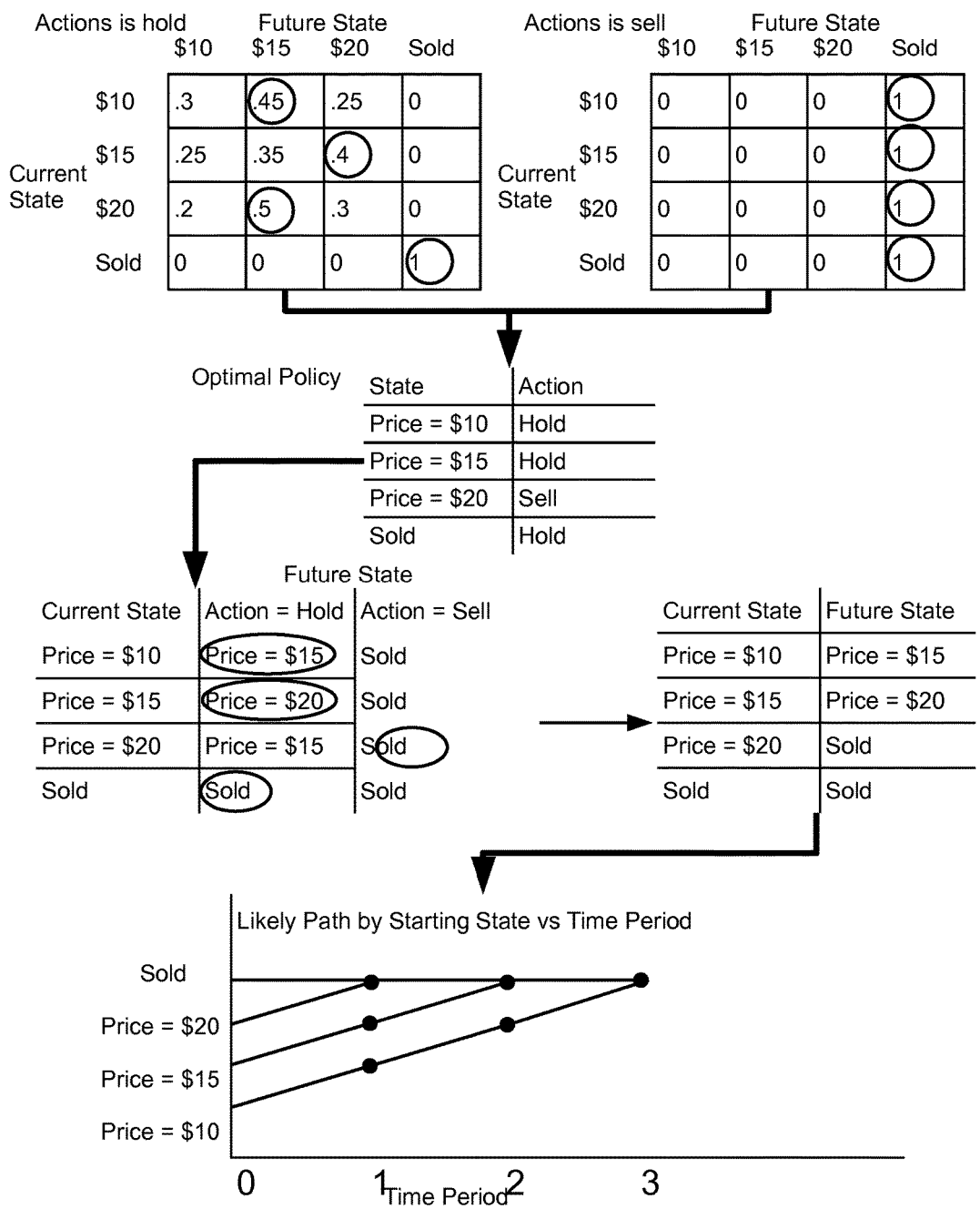
FIG. 15. is a graph showing the calculation of likely paths for a small sample problem.

FIG. 15. shows the process of calculating a likely path for a simple problem with four states, representing the price of a single share of a stock ($10, $15, $20, or Sold) and two actions, representing the subject's ability to hold or sell the share. The frames of the transition matrix describe the movement between states when each action is taken. In each row, the statistically most likely transition has been circled. The frames of the matrix are combined to form a total transition matrix. This total transition matrix, along with the state set, action set, time index (not pictured), reward matrix (not pictured), and discount factor (not pictured), forms a sequential decision problem. The optimal policy obtained by solving the sequential decision problem shows the value-maximizing action for each state. The next two tables show the process of combining the likely transitions and the optimal policy to determine the most likely future state for each starting state. Finally, the graph shows one method for display the likely paths from each starting state.

What is claimed is:

1. A computer-aided decision making system, comprising:
a user input device;
a user output device; and
a processor programmed to evaluate decision problems available to a user; the programmed processor:
(A) facilitating input of information from the user via the user input device, the information including
   (i) a decision problem to be solved, the decision problem to be solved defined by
   (ii) an action set, the action set has elements representing actions available to a subject, each element in the action set having a corresponding action cost, the corresponding action costs forming an action cost set,
   (iii) at least one state dimension representing conditions relevant to the subject of the decision problem, each state dimension has elements representing values of a condition relevant to the decision problem,
   (iv) each state dimension having a corresponding reward vector representing a reward to the subject associated with the elements of the state dimension, before consideration of the action cost set,
   (v) each state dimension having a corresponding transition matrix containing, for each element in the state dimension, a probability of moving from each state in the state dimension to each state in the state dimension for each action in the action set,
   (vi) a time index and a discount factor, the time index containing decision points available to the user, each decision point representing a point in time when the user selects from the action set, and the discount factor representing a subject's preference for rewards relative to time,
(B) the programmed processor combining the reward vectors with the action cost set to form a reward matrix and the programmed processor combining the transition matrices with the action set to form a total transition matrix;
(C) the programmed processor forming a functional equation from the at least one state dimension, the reward matrix, the total transition matrix, and the time index and the discount factor;
(D) the programmed processor evaluating the functional equation, including error-checking and validating the inputs and performing a convergence check to ensure that the functional equation will be solvable, and the programmed processor solving the functional equation;
(E) the programmed processor generating an optimal policy by using the solved functional equation to find, for every point in the time index, an overall value-maximizing action;
(F) the programmed processor generating at least one projected path beginning at a starting state by
   (i) identifying a set of assumed actions by selecting the value-maximizing action for each potential state at an initial point in the time index, based upon the optimal policy
   (ii) evaluating, for the assumed action, a transition to occur by comparing the probabilities in the total transition matrix for the combination of state dimensions;
   (iii) generating the projected path for each decision point in the time index by selecting the transition from the possible transitions at each decision point based upon the current state, the reward in the current state given the assumed action and the transition at the next decision point in the decision index, where the selection is based on the transition probabilities, the decision advice, and the reward matrix;

(G) the programmed processor outputting the projected path to the user through the user output device.

2. A computer-aided decision making system according to claim 1, wherein the programmed processor evaluates, for the assumed actions, the most probable transition and generates the path for each decision point in the decision index using the most probable transition.

3. A computer-aided decision making system according to claim 1, wherein the programmed processor evaluates, for the assumed action, the most probable transition and generates a projected path for each decision point in the time index using the most probable transition and the programmed processor generates a second-path for a less probable transition based upon user-provided alternate path-selection criteria.

4. A computer-aided decision making system according to claim 3, wherein the programmed processor evaluates a set of transition probabilities, the set of transition probabilities having the most likely transition and at least one less likely transition; and determines if more than one transition probabilities are above a preset condition, which may be modified by the user, then uses one of the user-specified methods of alternating different possible paths, and if only one transition probability is above the preset condition, then uses the numerically highest transition probability to select the most likely path in every instance.

5. A computer-aided decision making system according to claim 1, wherein the programmed processor displays the overall value-maximizing action at every point in the time index along the paths for different starting states at the initial point in the time index.

6. A computer-aided decision making system according to claim 3, wherein the programmed processor displays the rewards along the projected paths for different starting states at the initial point in the time index.

7. A computer-aided decision making system according to claim 1, wherein the programmed processor receives subject personality information and uses the subject personality information to determine path-selection criteria or otherwise define the assumed action.

8. A computer-aided decision making system according to claim 3, wherein the programmed processor, upon evaluating at least two alternate paths, selects the least probable transition.

9. A computer-aided decision making system according to claim 1, wherein the programmed processor receives at least 2 state dimensions and prompts the user to select a subset of the state dimensions and projects a projected path for the selected state dimensions.

10. A computer-aided decision making system according to claim 1, wherein the programmed processor prompts the user to select an analysis of the state dimensions in the decision problem, and the programmed processor conducts an analysis of state dimensions to determine one or more significant state dimensions, based upon standard statistical significance techniques for significance of variables and projects the projected path for each significant state dimension(s).

11. A computer implemented method for assisting a user in making a decision comprising:
providing a computer system having a user input device, a user output device, and a processor programmed with instructions to evaluate a decision problem available to the user, the instructions programming the processor:

(A) using the computer system to provide the user with an option for selecting the decision problem to be solved, the user inputs information via the user input device to define the decision problem, the information including
  (i) a decision problem to be solved, the decision problem to be solved defined by
  (ii) an action set, the action set has elements representing actions available to a subject, each element in the action set having a corresponding action cost, the corresponding action costs forming an action cost set,
  (iii) at least one state dimension representing conditions relevant to the subject of the decision problem, each state dimension has elements representing values of a condition relevant to the decision problem,
  (iv) each state dimension having a corresponding reward vector representing a reward to the subject associated with the elements of the state dimension, before consideration of the action cost set,
  (v) each state dimension having a corresponding transition matrix containing, for each element in the state dimension, a probability of moving from each state in the state dimension to each state in the state dimension for each action in the action set,
  (vi) a time index and a discount factor, the time index containing decision points available to the user, each decision point representing a point in time when the user selects from the action set, and the discount factor representing a subject's preference for rewards relative to time, (B) forming, by the computer system manipulating the reward vectors with the action cost set, a reward matrix, and by the computer system manipulating the transition matrices with the set of actions, a total transition matrix, (C) forming, by the computer system manipulating the at least one state dimension, the reward matrix, the total transition matrix and the time index and the discount factor, a functional equation, (D) evaluating, by the computer system, the functional equation including error-checking and validating the inputs and performing a convergence check to ensure that the functional equation will be solvable, and solving the functional equation;

(E) generating, by the computer system, an optimal policy by using the solved functional equation to find, for every point in the time index, an overall value-maximizing action;

(F) generating, by the computer system, at least one projected path beginning at a starting state by
  (i) identifying a set of assumed actions by selecting the value-maximizing action for each potential state at an initial point in the decision index, based upon the optimal policy
  (ii) evaluating, for the assumed action, a transition to occur by comparing the probabilities in the total transition matrix for the combination of state dimensions;
  (iii) generating the projected path for each decision point in the time index by selecting the transition from the possible transitions at each decision point based upon the current state, the reward in the current state given the assumed action and the transition at the next decision point in the decision index, where the selection is based on the transition probabilities, the decision advice, and the reward matrix;

(G) outputting, by the computer system, the projected path to the user through the user output device.

12. A method as set forth in claim 11, wherein the computer system evaluates, for the assumed actions, the most probable transition and generates the path for each decision point in the decision index using the most probable transition.

13. A method as set forth in claim 11, wherein the computer system evaluates, for the assumed action, the most probable transition and generates a projected path for each decision point in the time index using the most probable transition and the programmed processor generates a second path for a less probable transition based upon user-provided alternate path-selection criteria.

14. A method as set forth in claim 13, wherein the computer system evaluates a set of transition probabilities, the set of transition probabilities having the most likely transition and at least one less likely transition; and determines if more than one transition probabilities are above a preset condition, which may be modified by the user, then uses one of the user-specified methods of alternating different possible paths, and if only one transition probability is above the preset condition, then uses the numerically highest transition probability to select the most likely path in every instance.

15. A method as set forth in claim 11, wherein the computer system displays the overall value-maximizing action at every point in the time index along the paths for different starting states at the initial point in the time index.

16. A method as set forth in claim 13, wherein the computer system displays the rewards along the projected paths for different starting states at the initial point in the time index.

17. A method as set forth in claim 11, wherein the computer system receives subject personality information and uses the subject personality information to determine path-selection criteria or otherwise define the assumed action.

18. A method as set forth in claim 13, wherein the computer system, upon evaluating at least two alternate paths, selects the least probable transition.

19. A method as set forth in claim 11 wherein the computer system receives at least 2 state dimensions and prompts the user to select a subset of the state dimensions and projects a projected path for the selected state dimensions.

20. A method as set forth in claim 11 wherein the computer system prompts the user to select an analysis of the state dimensions in the decision problem, and the programmed processor conducts an analysis of state dimensions to determine one or more significant state dimensions, based upon standard statistical significance techniques for significance of variables and projects the projected path for each significant state dimension(s).

* * * * *